Dec. 12, 1967 T. W. POWELL 3,358,235

CODED SIGNAL ALERTING DEVICE

Filed Dec. 18, 1964 2 Sheets-Sheet 1

INVENTOR
TRUMAN W. POWELL

BY Jmirie and Smiley
ATTORNEYS

Dec. 12, 1967 T. W. POWELL 3,358,235

CODED SIGNAL ALERTING DEVICE

Filed Dec. 18, 1964 2 Sheets-Sheet 2

INVENTOR.
TRUMAN W. POWELL
BY Imirie and Smiley
ATTORNEYS.

United States Patent Office 3,358,235

Patented Dec. 12, 1967

3,358,235

CODED SIGNAL ALERTING DEVICE

Truman W. Powell, 1146 St. Augustine Place NE., Atlanta, Ga. 30306

Filed Dec. 18, 1964, Ser. No. 419,326
10 Claims. (Cl. 325—466)

The present invention relates to an electric signal monitoring apparatus or, more particularly, to an alerting device the operation of which is dependent upon the reception of a predetermined coded radio frequency signal. The preselected code signal is of the interrupted type having portions which transmit unmodulated carrier frequency and a portion which transmits modulated carrier frequency, there being short intervals of silence, or breaks, between said portions. The instant apparatus is particularly useful for the unattended monitoring and reception of alerts for Civil Defense purposes, but is also useful to operators of radio broadcasting equipment, commercial, industrial and amateur services which are required to have available monitoring equipment in order that radio broadcasting, other than that for Civil Defense purposes, may be discontinued during an alert.

While a variety of equipments for this latter purpose is presently available, these generally rely upon the operation of bells, buzzers, alarms and other signaling means to warn of the alert. In my U.S. Patent 2,879,383 is disclosed an apparatus particularly useful in the reception of Conelrad Alerts and wherein a conventional radio receiver is automatically converted, from reception of the broadcast to which it may be tuned, to receive an alert broadcast on one of the Conelrad frequencies 640 or 1260 kilocycles during a Conelrad test and upon transmission of a preselected pulse signal.

The present invention has for its purpose to provide a suitable monitoring apparatus which will decode a particular coded signal constituting interrupted unmodulated and modulated carrier frequencies separated by definite time intervals and utilizing a carrier frequency upon which the alert broadcast is subsequently to be made.

It is therefore a principal object of the present invention to provide an electronic signal monitoring apparatus in which a continuously operating, unattended monitoring circuit is responsive to a predetermined coded signal having interrupted, unmodulated and modulated portions to automatically actuate and alert a receiving circuit tuned to the carrier frequency.

It is a further object of the present invention to convert conventional radio and television receivers to permit dual operation as receivers and as alerting apparatus.

It is another object of the present invention to provide a continuously operating monitoring and alerting circuit including components which upon reception of a predetermined coded signal, of the above described characteristics, activates the monitoring circuits to convert a radio receiver or like device to an alerting apparatus.

It is yet another object of the present invention to provide an electronic alerting device including an unattended, continuously operating, monitoring circuit responsive to a predetermined coded signal having interrupted unmodulated and modulated portions and including an audio circuit for subsequent reception of an alert broadcast by such monitoring apparatus after broadcast of the above described coded signal.

A still further object of the invention is to provide an alerting device, connectable to a radio-television receiver, audio amplifier, recorder or other device, which will monitor a preselected frequency and upon receipt of a predetermined code signal switch the connected device on to receive the amplitude modulated alert message broadcast on said frequency following the code signal.

A still further object of the present invention is to provide an alerting device, of the above described characteristics, which is operative after termination of the alert message to switch off the connected device and return the alerting circuit to monitoring condition.

Yet another object of the present invention is to provide an alerting device, of the above described characteristics, which incorporate its own audio amplifier as an integral portion of the monitoring circuit.

Still another object of the invention is to provide an alerting device, of the above described characteristics, which is transistorized and therefore of small size and which is economical to fabricate and use.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figures 1, 3:
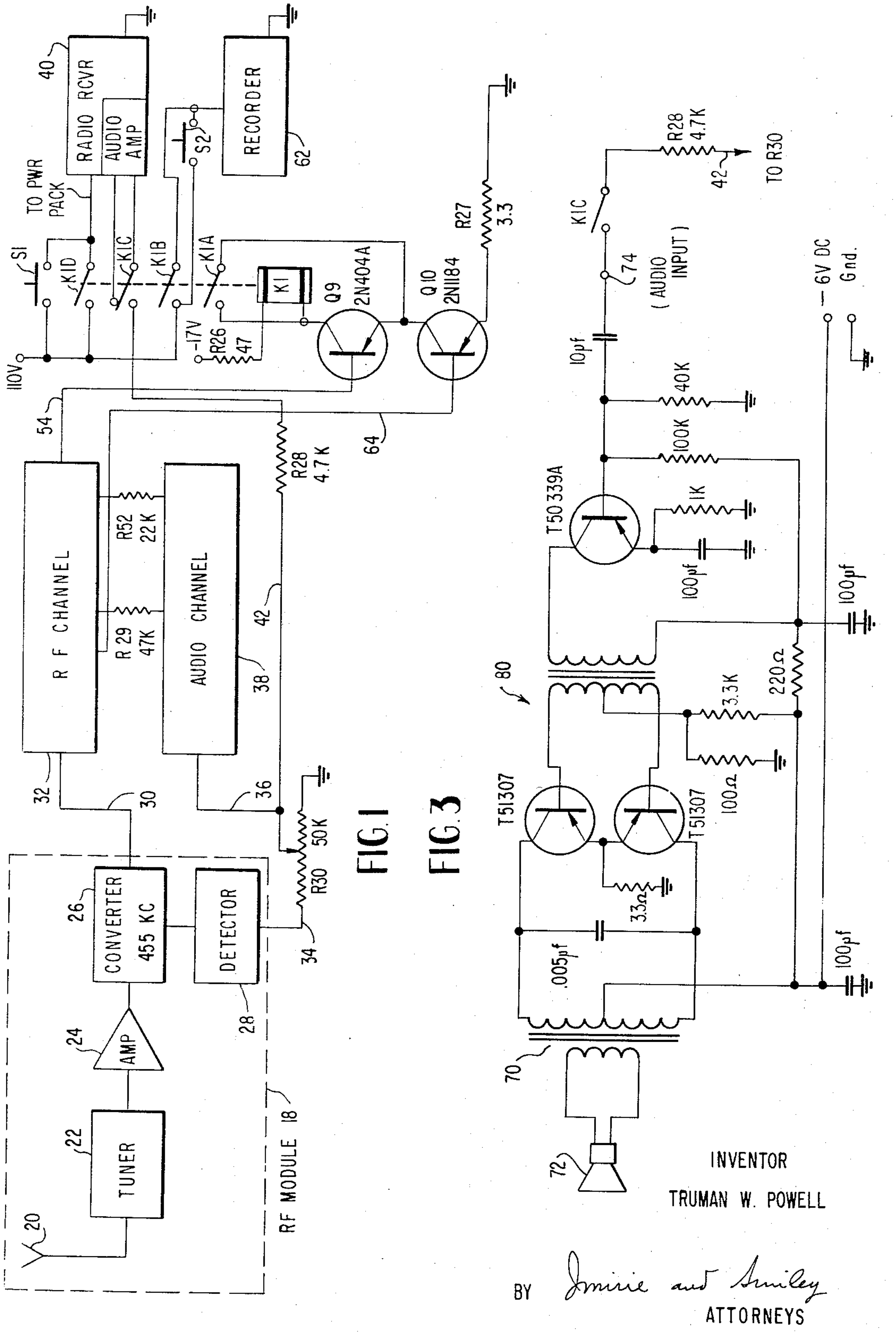
FIG. 1 is a schematic diagram of an alerting device according to the present invention connected to a conventional superheterodyne receiver for actuating the latter upon reception of an alert signal.
FIG. 3 is a schematic circuit diagram of an audio amplifier adapted to be incorporated within the alert device of FIG. 1 in place of the radio receiver.

Referring now more particularly to the drawings, FIG. 1 illustrates a device according to the invention designed to receive a coded alert signal in the 160 meter band, or from about 1.8 to 2.0 megacycles. In all figures the values of the resistors are given in ohms and the values of the capacitors in microfarads unless otherwise specified. The coded signal, which the illustrated circuit is designed to operate upon, comprises five portions, i.e. ten seconds of unmodulated carrier, a five second break, five seconds of unmodulated carrier, another five second break, and fifteen seconds of carrier modulated with a 1500 cycle per second tone. The device is powered by a conventional transistorized power circuit not shown which converts 110 volts A.C. to −17, −12 and −6 volts D.C. Suitable terminals of the power source are connected across the ground lines 10 and 12 and the power lines 14 and 16, FIG. 2.

The device has an input RF module 18 comprising an antenna 20, a tuner 22, an amplifier 24, a converter 26 for realizing the intermediate frequency of 455 kilocycles and a detector 28. The output 30 of the converter is connected to capacitor C1, FIG. 2 which is the input to a radio frequency channel 32 to be described. The output 34 of detector 28 is connected through resistor R30 and line 36 to an audio channel 38 through the capacitor C10, FIG. 2 and through line 42 to the radio receiver 40 which is to be alerted.

Figure 2:
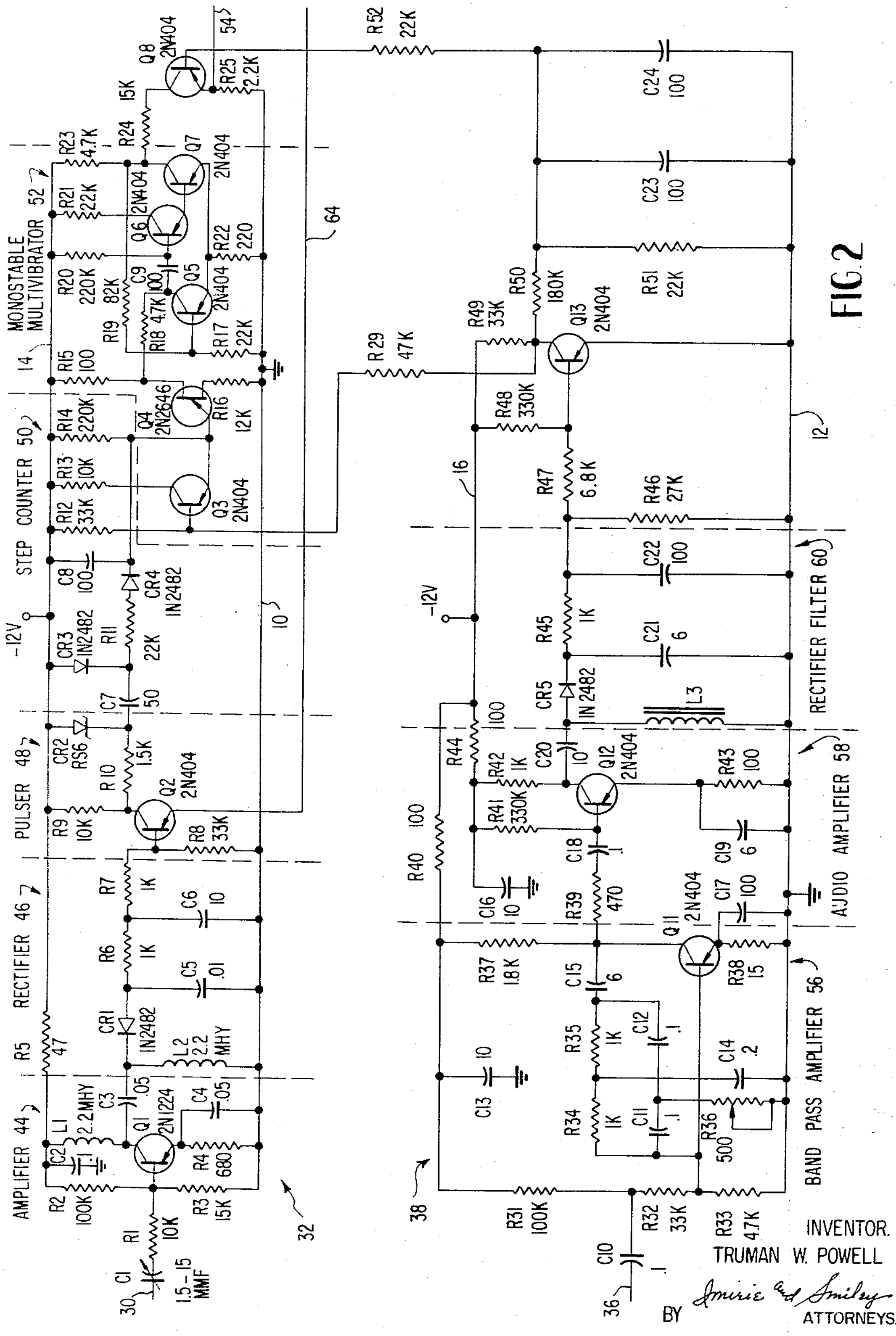
FIG. 2 is a circuit diagram of the RD and audio channels of the device shown in FIG. 1.

The radio frequency channel 32 comprises a radio frequency amplifier 44 having transistor Q1 and associated circuit elements, as indicated in FIG. 2, connected to a rectifier 46 comprising the rectifier CR1 in series with the capacitor resistor network C5, C6, R6, R7. Resistor R7 is connected to the base of a transistor Q2 which with its associated components resistors R8, R9 and R10 and the rectifier CR2 comprise a pulser 48 leading to input capacitor C7 of a step counter 50 including rectifiers CR3 and CR4 and condenser C8. The step counter output is connected to R13 and R14 which in turn connect to the transistors Q3 and Q4. The base of the unijunction transistor Q4 is connected as the input to the monostable multivibrator 52 comprising the transistors Q5, Q6 and Q7 and their associated circuit elements connected as shown. The collector of transistor Q7 as an output of the multivibrator is connected through resistor R24 to the collector of the coincidence transistor Q8. The emitter of transistor Q8 is connected through line 54 to the base of transistor Q9, FIG. 1, which when conducting serves to energize the output relay K1.

The audio frequency channel 38 comprises a band-pass amplifier 56 including transistor Q11 and its associated component parts and whose input is connected to the capacitor C10 and line 36. The collector of transistor Q11 is connected through resistance R39 and capacitor C18 to the base of transistor Q12 which, with its associated components, comprises an audio amplifier 58 having an output in capacitor C20. The capacitor C20 is connected to the rectifier CR5 which, with a network of capacitors, resistors and inductors as shown, comprises a rectifier filter circuit 60 connected through resistor R47 to the base of transistor Q13. The collector of Q13 is connected through resistor R29 to the base of transistor Q3 in the radio frequency channel 32. The collector of transistor Q13 is also connected through the resistor R50 and an associated network including resistor R51, capacitor C23 and capacitor C24 in parallel, forming a time constant network, to resistor R52 and thence to the base of the coincidence transistor Q8.

The output relay K1 is connected in series with transistors Q9 and Q10 and resistance R27 between a −17 volt terminal of the power source and a ground. Relay K1 has sets of contacts labeled K1A, K1B and K1C and K1D. Contact K1A is connected across the collector and emitter of transistor Q9 and forms a holding contact to retain the relay energized once contact K1A is closed. Contact K1B in parallel with the manual switch S2 opens and closes a 110 v. AC energizing circuit for a recorder 62. Contact K1C, normally closed, connects the detector to the audio amplifier of radio receiver 40 for normal operation. When relay K1 operates, contact K1C opens this connection and closes a circuit from the audio amplifier of the radio receiver to resistor R28 and through line 42 to potentiometer R30 for applying detected audio signals from the RF module 18 to the radio receiver. Normally open contact K1D, when closed, closes the circuit from the 110 volt AC power source to the power pack of the radio receiver 40 to energize the receiver.

The alerting device as illustrated in the circuit diagrams of FIGS. 1 and 2 operate as follows. Upon reception in RF module 18 of an interrupted code signal including the unmodulated and modulated carrier portions as previously described, the antenna 20 and tuner 22 being tuned to the preselected frequency, the coded signal is amplified in 24, converted to 455 kilocycles in 26 and demodulated in 28.

The radio frequency channel 32, comprising transistors Q1, Q2, Q3, and Q4, along with associated circuitry decodes the unmodulated RF portion of the transmitted code, and sets the timing multivibrator comprising Q5, Q6 and Q7 which supplies one half of the coincidence information. The audio section of the code must then follow in the proper timing sequence in order to complete coincidence.

Transistor Q1 and associated circuitry is an RF amplifier which amplifies the incoming signal to a usable value. The input to Q1 may be adjusted by varying capacitor C1. Rectifier 46 rectifies and filters the RF voltage and applies the resultant DC voltage to the base of Q2. When RF signal is present Q2 conducts. The two unmodulated pulses of the code signal produce negative voltages at the base of Q2. The collector of Q2 swings 11 volts in the positive direction when RF of the proper frequency is present. The step counter 50 counts these pulses and due to the time constants of the step counter circuit produces a voltage across R14 which will fire transistor Q4 if the two RF pulses are of the proper duration and if they are of the proper time relationship. The value of R16 must be preselected to compensate for variations in transistor Q4 and the components of step counter 50.

Transistor Q3 is provided to ensure that the step counter does not operate transistor Q4 on the audio modulated portion of the coded signal. During the unmodulated portion of the signal there is a bias applied to transistor Q3 through resistor R29, holding Q3 in the off-state. If any audio of the code frequency is present in the signal the audio is amplified through transistor Q13, which in turn switches Q3 on and keeps Q4 from operating. During the signal intervals when audio is present Q3 is switched on but Q4 has already operated as a result of the preceding unmodulated signal pulses. Thus Q3 acts primarily as an audio switch and as a safety device for eliminating the effects of lightning and of harmonics generated by multi-transmitter keying.

When the step counter 50 allows transistor Q4 to conduct, capacitor C8 is discharged through resistor R15 which causes a positive trigger to be applied to the monostable multivibrator 52. In the stable state, transistor Q5 is cut off and transistor Q7 is conducting. The application of the positive trigger to the collector of transistor Q5 causes the multivibrator to go into its quasi stable state. In the quasi stable state, transistor Q7 is cut off and its selector is at −12 volts thus supplying full collector voltage to coincidence transistor Q8 to complete the coincidence function of the RF channel 32. A further function of the RF channel is through transistor Q2 and line 64 to activate, or turn on, the carrier hold transistor Q10, which provides a ground path for relay K1 whenever and as long as carrier frequency is present.

The audio channel 38 of the unit receives its signal from the detector 28 in the RF module. This signal is applied to the band pass amplifier 56 comprising transistor Q11 and associated components. The output of Q11 is applied to the base of transistor Q12 in the audio amplifier 58. The output of transistor Q12 is rectified and filtered by rectifier filter 60. The resultant voltage is applied to the base of normally conducting transistor Q13 through resistor R47. Transistor Q13 is thus cut off causing its collector to go to −12 volts which provides a source of voltage for a time constant circuit comprising resistors R50 and R51 and capacitors C23 and C24. The voltage across capacitors C23 and C24 furnishes a forward bias to the base of coincidence transistor Q8 through resistor R52. If the coded input signal has met the proper time sequence relationship as between the modulated and unmodulated portions, and if the output from the audio channel appears during the unstable condition of the multivibrator, the multivibrator will still be in its quasi stable state, collector voltage will still be applied to transistor Q8 to conduct, turning on transistor Q9 and causing relay K1 to operate. The time constants of the multivibrator 52 are such that unless the modulated portion of the pulse appears within the specified code time the collector voltage of Q8 will be removed and coincidence cannot occur. The time constants of the transistor Q13 circuit are such that unless 15 seconds, or other selected interval, of audio modulation occurs the voltage at the base of transistor Q8 will not reach a voltage sufficient for Q8 to conduct and coincidence will not occur.

Once relay K1 operates, it is held on through its normally open contact K1A, now closed and in series with carrier hold transistor Q10. When RF carrier is interrupted, transistor Q10 ceases to conduct allowing relay K1 to de-energize.

In a typical installation, the contacts K1D and K1C are respectively used as shown to turn on a radio receiver and at the same time disconnect the detector of the radio from its audio amplifier. The detector output line 42 of the unit is simultaneously connected to the audio amplifier of the receiver causing the combined system to receive messages broadcast on the code frequency immediately subsequent to broadcast of the code signal and before the carrier is interrupted. Auxiliary relay contact K1B is available for operating a tape recorder or like instrument for recording the received alert message.

In FIG. 3 is shown a transistorized audio amplifier 80 which may be incorporated into the alerting device for self contained operation in place of the radio receiver 40. As will be apparent from examination of the circuit the audio amplifier 80 comprises three transistors two of which are connected in pushpull across a transformer 70 whose secondary feeds a speaker 72. The −6 volt and ground terminals are connected to the power pack (not shown) of the alerting device, preferably through contact K1D of relay K1, while the audio input terminal 74 is connected to the contact K1C on relay K1 of FIG. 1 in such manner as to connect detector 28 to amplifier 80 when contact K1C is closed by operation of the alerting device and energization of relay K1. The audio input 74 is thus connected by contact K1C through resistor R28, line 42 and potentiometer R30 to the RF module 18 for reception of detected audio signals. The addition of audio amplifier, FIG. 3 to the alerting device make unnecessary radio receiver 40, or any modification thereto, and the alerting device is thus provided with its own means for receiving the audio alert message following the coded signal.

It will be apparent from the above, that any suitable device such as a television receiver, recorder and the like may be actuated by the described invention to receive an alert broadcast message. By proper selection of the values and characteristics of the component parts in the illustrated circuits, the device may be made to operate on different frequencies and with a different coded signal. Obviously, output relay K1 may be provided with additional sets of make and break contacts for actuating other auxiliary devices than those shown, or explained above.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. An alerting device comprising receiving means including a detector for reception of an interrupted code signal having unmodulated and modulated portions, a radio frequency channel including a monostable relaxation oscillator connected to receive unmodulated signal portions from said receiving means, an audio frequency channel connected to receive modulated signal portions from said detector of the receiving means, an audio amplifier, a switching means, and means operably connecting said switching means to said radio frequency and audio channels and said audio amplifier so as to energize the audio amplifier and connect the audio amplifier to said detector of the receiving means upon coincidence of the output from said audio channel with a trigger to said relaxation oscillator which drives said oscillator to its quasi stable state.

2. An alerting device adapted to operate upon receipt of a code signal including interrupted unmodulated and modulated carrier frequency portions, comprising receiving means for said code signal and including a radio frequency and an audio output, a radio frequency channel connected to said radio frequency output of the receiving means and including a step counter and a monostable multivibrator, an audio frequency channel connected to said audio output of said receiving means, and including a time constant circuit output, an audio amplifier, and switching means in the outputs of said radio frequency and audio frequency channels operable to connect said audio amplifier to the audio output of said receiving means only upon coincidence of the audio channel output signal with a trigger to said multivibrator which drives the multivibrator into its quasi stable state.

3. An alerting device according to claim 2 wherein said switching means comprises a relay.

4. An alerting device according to claim 2 wherein said radio frequency channel comprises a radio frequency amplifier, a rectifier, and a pulser in series with said step counter and monostable multivibrator.

5. An alerting device according to claim 2 wherein said audio amplifier is part of a radio receiver, said switching means being operative to connect the receiver to a power source and the audio amplifier to the audio output of said receiving means upon reception of a predetermined code signal.

6. An alerting device according to claim 2 wherein said switching means comprises a relay in series with a source of potential and an electron discharge element, said electron discharge element being so connected to a coincidence element in said radio frequency channel which is also fed by the audio channel output as to conduct and energize said relay only when an output pulse of the audio frequency channel coincides with a trigger pulse to said monostable multivibrator which places the multivibrator in quasi stable state.

7. An alerting device according to claim 6 wherein a second electron discharge element is connected in series with said relay, said second electron discharge element being so connected to said radio frequency channel as to bypass carrier frequency signals around said step counter and monostable multivibrator.

8. An alerting device according to claim 7 wherein said relay is provided with normally open contacts connected across said first electron discharge element so as to close and hold the relay energized once the relay operates.

9. An alerting device according to claim 8 wherein said relay is provided with additional sets of contacts for switching on additional instruments including a recorder.

10. An alerting device according to claim 6 wherein said audio frequency channel comprises a band pass amplifier, an audio amplifier, rectifier filter, and a normally conducting electron discharge element connected to said coincidence element of said radio frequency channel, said normally conducting electron discharge element being cut-off by presence of audio modulated signals in the audio frequency channel.

References Cited

UNITED STATES PATENTS 3,122,705 2/1964 Craig et al. -------- 325—466

KATHLEEN H. CLAFFY, *Primary Examiner.*

R. LINN, *Assistant Examiner.*